April 16, 1957  R. L. ORMSBY  2,788,590
EXAMINATION DEVICE
Filed July 8, 1954
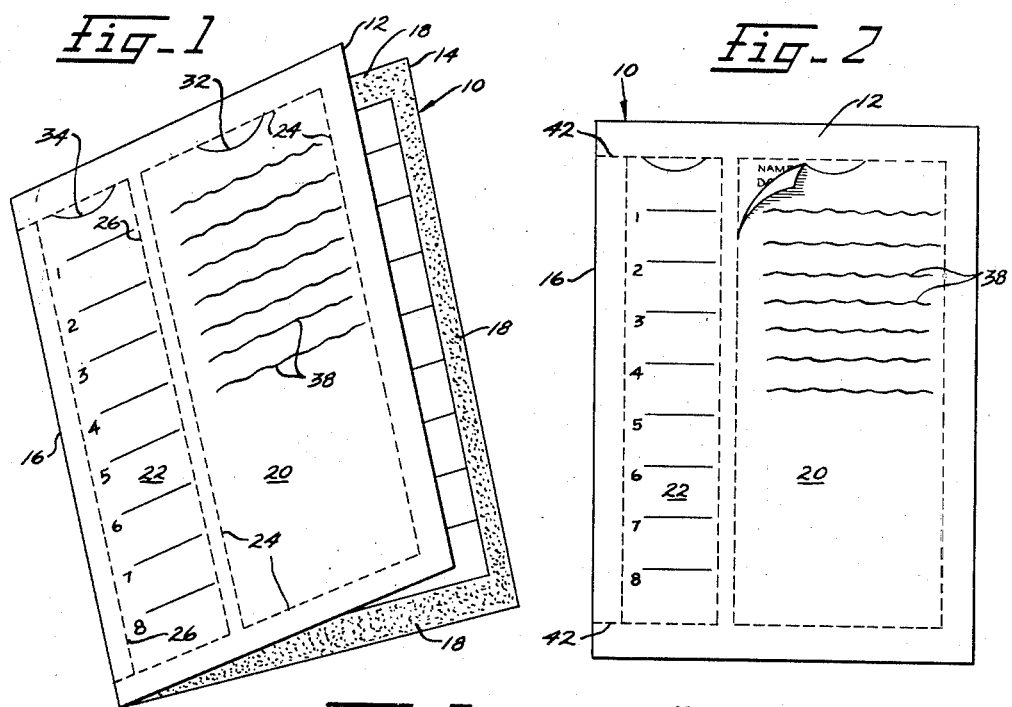
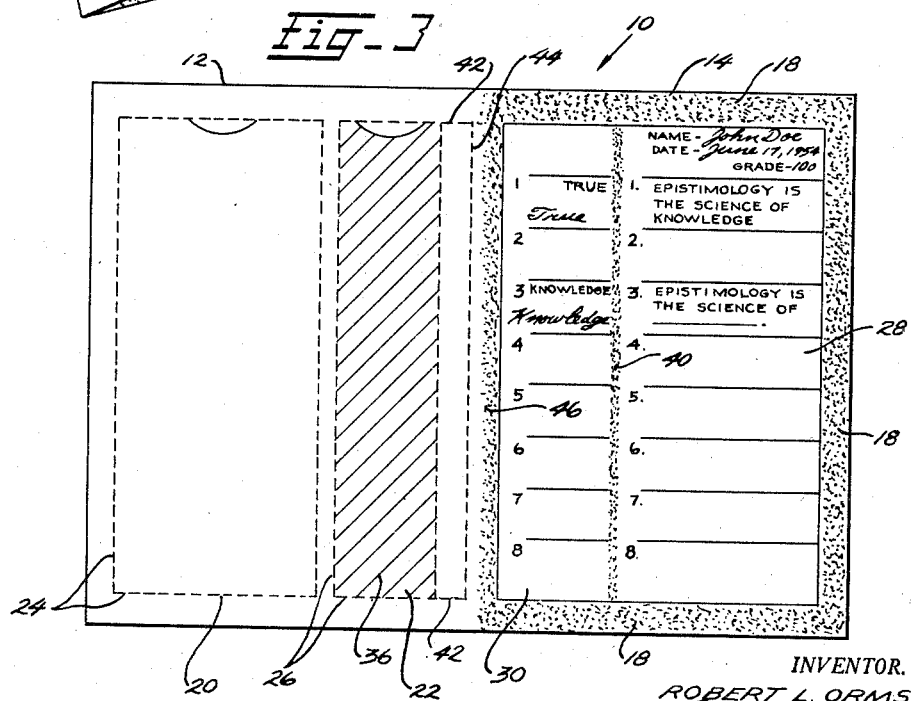
INVENTOR.
ROBERT L. ORMSBY
BY
ATTORNEY

2,788,590

EXAMINATION DEVICE

Robert L. Ormsby, Marlborough, Conn.

Application July 8, 1954, Serial No. 442,115

4 Claims. (Cl. 35—48)

This invention relates to improvements in written examination devices and its general object is to provide a simple and economical combined printed examination and answer form.

It is a more specific object of the invention to provide in a single instrumentality a cheat-proof printed examination form for a student or other examinee, a duplicating answer pad for the written answers of the student whereby the student can retain a copy of his answers and turn in a copy thereof to the examiner who will find it easy to compare the written answers to the printed answers incorporated in the form but inaccessible to the student.

Other objects and features of the invention will become apparent to those skilled in the art from the following description of the annexed drawing which, by way of example only, illustrates one specific embodiment of the invention and in which, Fig. 1 is a perspective view of the examination device showing the front and back sheets separated;

Fig. 2 is a front view of the device; and

Fig. 3 shows the device fully opened so as to reveal the front of the back sheet and the back of the front sheet.

As is best shown in Fig. 1, the examining device 10 comprises a front sheet 12 and a back sheet 14 which are arranged in booklet-like fashion. Preferably, the sheets 12 and 14 are defined from a single web of paper which is cut to proper length and then folded upon itself along the folded edge 16 to define the sheets 12 and 14 of equal size.

The front or top sheet 12 is secured in folded superimposed relationship on the bottom sheet 14 by providing an adhesive margin 18 along the top and bottom edges and along the outer side edge of the said bottom sheet. A pair of detachable panels 20 and 22 are provided in the top sheet 12 preferably in side-by-side relationship as shown, but the said panels can be arranged in any other desired relationship. The means providing detachment for the said panels are a series of perforations 24, 24 surrounding the panel 20 and the perforations 26, 26 surrounding the panel 22.

It will be observed that one of the panels, such as the panel 20, is relatively large as compared to the other panel 22. The larger panel 20 is utilized to cover a selected area or portion 28 on the top face of the bottom sheet 14 and the panel 22 covers a lesser area or portion 30 of the top face of the bottom sheet 14. Detachment of the panels 20 and 22 is facilitated by the openings 32 and 34 which are located, respectively, along the lines of the perforations 24 and 26 so that a finger can be inserted therein to start removal of the respective panels along the perforated margins thereof.

Referring now to the bottom sheet 10 and with particular reference to Fig. 3, it will be noted that the area or portion 28 of said bottom sheet carries the printed examination questions which may conveniently be arranged in numerical order as illustrated. The area or portion 30 of the said sheet 14 carries an answer column wherein the spaces for answering are numbered correspondingly to the numbered questions. In each answer space, in an unobtrusive portion thereof, the correct answer to the corresponding problem is printed. The remainder of the answer space is available for the written answers of the student.

The said written answers of the student are imparted to the answer spaces in the area 30 on the back sheet by writing the answers in similarly numbered and similarly arranged answer spaces provided on the panel 22. The said panel 22 has a carbon backing 36 or is provided with a detachable carbon sheet so as to duplicate the written answers on the panel 22 on the answer area 30.

Additional details of structure will be furnished in the following explanation of the use of the device to complete the understanding of the invention.

The examiner or proctor furnishes the student or examinee with the form 10 as shown in Fig. 2 wherein the top sheet 12 is sealed upon the back sheet 14. On the outer or top face of the panel 20 instructions for taking the examination may be printed as indicated by the lines 38, 38. Such printed legend may state the time allowed for taking the examination and the other rules to be followed in answering the same. Then, upon receiving from the proctor or examiner the "start" signal, the student is permitted to detach the panel 20 revealing the question portion 28 on the top face of the bottom sheet 14. The student will read the questions and supply his answers by writing the same in the numbered answer spaces provided on the top face of the panel 22. It will be quite apparent that this examination device can be used to particular advantage, but without limitation thereto, in conducting objective examinations having short answer or multiple choice questions.

After the student has completed the examination or at the time the examiner or proctor signals the end of the examining period, the student takes the form 10 to the examiner. The examiner will note whether the student has furnished his name and the date as may be required at the top portion of the question area 28. Upon receiving the examination form from the student, the examiner will then detach the panel 22 to be sure that the student's written answers are duplicated in the answer column provided in the area 30 on the sheet 14. Obviously, the written answers can easily be compared with the printed answers and the written answers graded accordingly. The student receives the panel 22 as a record of his answers while the examiner retains the duplicate copy thereof for permanent record purposes.

It will be quite apparent that the aforedescribed device provides a simple and economical examination which will facilitate the taking of said examination and the marking or grading of the same. In the taking of the examination, the instructor need not be concerned that the student will be enabled to cheat by revealing the printed answers in the answer area 30 on the bottom sheet. To be assured that the answer panel 22 cannot be lifted from the bottom sheet 14 to reveal the printed answers, an elongated adhesive area or strip 40 can be provided on the top face of the bottom sheet 14 between the answer area 30 and the question area 28.

It is obvious that different arrangements for the panels and question and answer areas can be afforded within the scope of the invention. In addition, other simple modifications can be affected. For example, the top and bottom perforations enclosing the answer panel 22 can be extended as indicated at 42, 42 to the folded edge 16 and the said folded edge can be perforated as indicated by the reference numeral 44 (Fig. 3) whereupon the panel 22 can be detached by tearing the same to the folded edge 16 and then along the perforations 44 provided thereon.

If the top sheet 12 is provided separately from the bottom sheet 14 and then sealed over the bottom sheet, it will be desirable to add the adhesive 46 along what would normally be the folded edge of the bottom sheet 14 to prevent access to the printed answers on said bottom sheet.

Having in mind that other modifications may be brought about within the scope of the invention, it is not my intent to limit the invention to the specific embodiment which is described otherwise than indicated by the claims which follow.

I claim as my invention:

1. A device for conducting a written question and answer type examination comprising, a top sheet and a bottom sheet arranged in superimposed relationship and connected along their adjacent marginal portions, said top sheet having two spaced apart separately detachable panels, one of which is provided with space for writing answers to the examination questions, the said bottom sheet being provided with two adjacent areas corresponding generally in size and location to said one panel and to the other of said panels, respectively, the said area corresponding to the said other panel being provided with the written questions of the examination, and means interposed between the said one panel and the corresponding area on the bottom sheet to duplicate the written answers on the last mentioned corresponding area.

2. A device for conducting a written question and answer type examination comprising, a top sheet and a bottom sheet arranged in superimposed relationship, the said top sheet having two spaced apart separately detachable panels one of which is provided with space for writing answers to the examination questions, the said bottom sheet being provided with two spaced apart areas corresponding generally in size and location to said one panel and to the other of said panels, respectively, the said area corresponding to the said other panel being provided with the written questions of the examination, means sealing said top sheet to the bottom sheet along their adjacent marginal edges and between the two panels, and means interposed between the said one panel and its corresponding area on the bottom sheet to duplicate the written questions on the last mentioned corresponding area.

3. A device for conducting a written question and answer type examination comprising, a booklet-like form defined from a paper sheet enfolded upon itself to provide a top sheet superimposed upon a bottom sheet of substantially equal size, the said top sheet having two spaced apart separately detachable panels, one of said panels being provided with space for writing answers to the examination questions, the said bottom sheet being provided with two spaced apart areas corresponding generally in size and location to the said one panel and to the other of said panels, respectively, the said area corresponding to the said other panel being provided with the written questions of the examination, means sealing said top sheet to the bottom sheet along their adjacent marginal portions and between the said panels, and means interposed between the said one panel and the corresponding area on the bottom sheet to duplicate the written answers on the last mentioned corresponding area.

4. A device for conducting a written question and answer type examination comprising, a booklet-like form defined from a sheet of paper enfolded upon itself to provide a top sheet superimposed upon a bottom sheet of substantially identical size, the said top sheet having two spaced apart separately detachable panels one of which is provided with space for writing the answers to the examination questions and the other of which is printed with the instructions for taking the examination, the said bottom sheet having two spaced apart areas corresponding generally in size and location to the said one panel and to the other of said panels, respectively, the said area corresponding to the said other panel being provided with the printed questions of the examination and the said area corresponding to the said one panel being provided with the printed correct answers to the said questions, means sealing the top sheet to the bottom sheet along their adjacent marginal portions and between the panels, and means interposed between the said one panel and its corresponding area on the bottom sheet to duplicate the written answers on the last mentioned corresponding area.

References Cited in the file of this patent

UNITED STATES PATENTS

| | | |
|---|---|---|
| 1,705,657 | Clapp et al. | Mar. 19, 1929 |
| 2,614,338 | Clark | Oct. 21, 1952 |